United States Patent
Rooney et al.

(10) Patent No.: US 11,254,877 B2
(45) Date of Patent: Feb. 22, 2022

(54) COKE MITIGATION IN HYDROCARBON PYROLYSIS

(71) Applicant: ExxonMobil Chemical Patents Inc., Baytown, TX (US)

(72) Inventors: Mark A. Rooney, Pasadena, TX (US); Yuti L. Yang, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/958,507

(22) PCT Filed: Dec. 6, 2018

(86) PCT No.: PCT/US2018/064286
§ 371 (c)(1),
(2) Date: Jun. 26, 2020

(87) PCT Pub. No.: WO2019/133215
PCT Pub. Date: Jul. 4, 2019

(65) Prior Publication Data
US 2021/0054293 A1    Feb. 25, 2021

Related U.S. Application Data

(60) Provisional application No. 62/611,863, filed on Dec. 29, 2017.

(51) Int. Cl.
*C10G 9/16* (2006.01)
*C10G 9/20* (2006.01)
(Continued)

(52) U.S. Cl.
CPC ............ *C10G 9/16* (2013.01); *B01J 19/002* (2013.01); *C10G 9/005* (2013.01); *C10G 9/206* (2013.01);
(Continued)

(58) Field of Classification Search
CPC .................... C10G 9/16; C10G 9/20–206
See application file for complete search history.

(56) References Cited

U.S. PATENT DOCUMENTS 4,257,105 A * 3/1981 Stewart ............... C10G 9/206
700/274
5,271,827 A * 12/1993 Woebcke ............. C10G 9/002
208/132
(Continued)

FOREIGN PATENT DOCUMENTS

CN      102998013 A    3/2013
WO    2011/057040 A    5/2011

OTHER PUBLICATIONS

Leino, Ryan, "When and when not to use thermowells in process temperature measurement", Processing Magazine, Jan. 10, 2018, obtained from https://www.processingmagazine.com/process-control-automation/instrumentation/article/15587300/when-and-when-not-to-use-thermowells-in-process-temperature-measurement (Year: 2018).*

*Primary Examiner* — Renee Robinson

(57) ABSTRACT

Methods and systems for using temperature measurements taken from a compact insulated skin thermowell to optimize a pyrolysis reaction are provided. In the present systems and methods, the upstream temperature and the upstream pressure of a pyrolysis reactor is measured through an adiabatic restriction in the inlet manifold of a parallel tube assembly to provide an absolute upstream temperature and an upstream pressure. The downstream temperature of the pyrolysis reactor is also measured following an adiabatic restriction to provide an absolute downstream temperature. The downstream pressure is then determined by multiplying the absolute upstream pressure with the quotient of the downstream temperature divided by the upstream temperature as taken to the power of k/k−1, where k is the ratio of
(Continued)

fluid specific heat at constant pressure (Cp) to fluid specific heat at constant volume (Cv).

22 Claims, 4 Drawing Sheets

(51) Int. Cl.
 *B01J 19/00* (2006.01)
 *C10G 9/00* (2006.01)
(52) U.S. Cl.
 CPC ............ *B01J 2219/00058* (2013.01); *B01J 2219/00065* (2013.01); *B01J 2219/00162* (2013.01); *B01J 2219/00247* (2013.01); *C10G 2300/4006* (2013.01); *C10G 2300/4012* (2013.01); *C10G 2300/708* (2013.01)

(56) References Cited

U.S. PATENT DOCUMENTS

| | | | |
|---|---|---|---|
| 5,400,657 A | 3/1995 | Kolpak et al. | |
| 5,446,229 A | 8/1995 | Taylor et al. | |
| 6,228,253 B1 | 5/2001 | Gandman | |
| 2001/0046460 A1 | 11/2001 | Zhurin et al. | |
| 2002/0034463 A1* | 3/2002 | Di Nicolantonio | B01J 8/062 422/199 |
| 2006/0102327 A1 | 5/2006 | Inui et al. | |

* cited by examiner

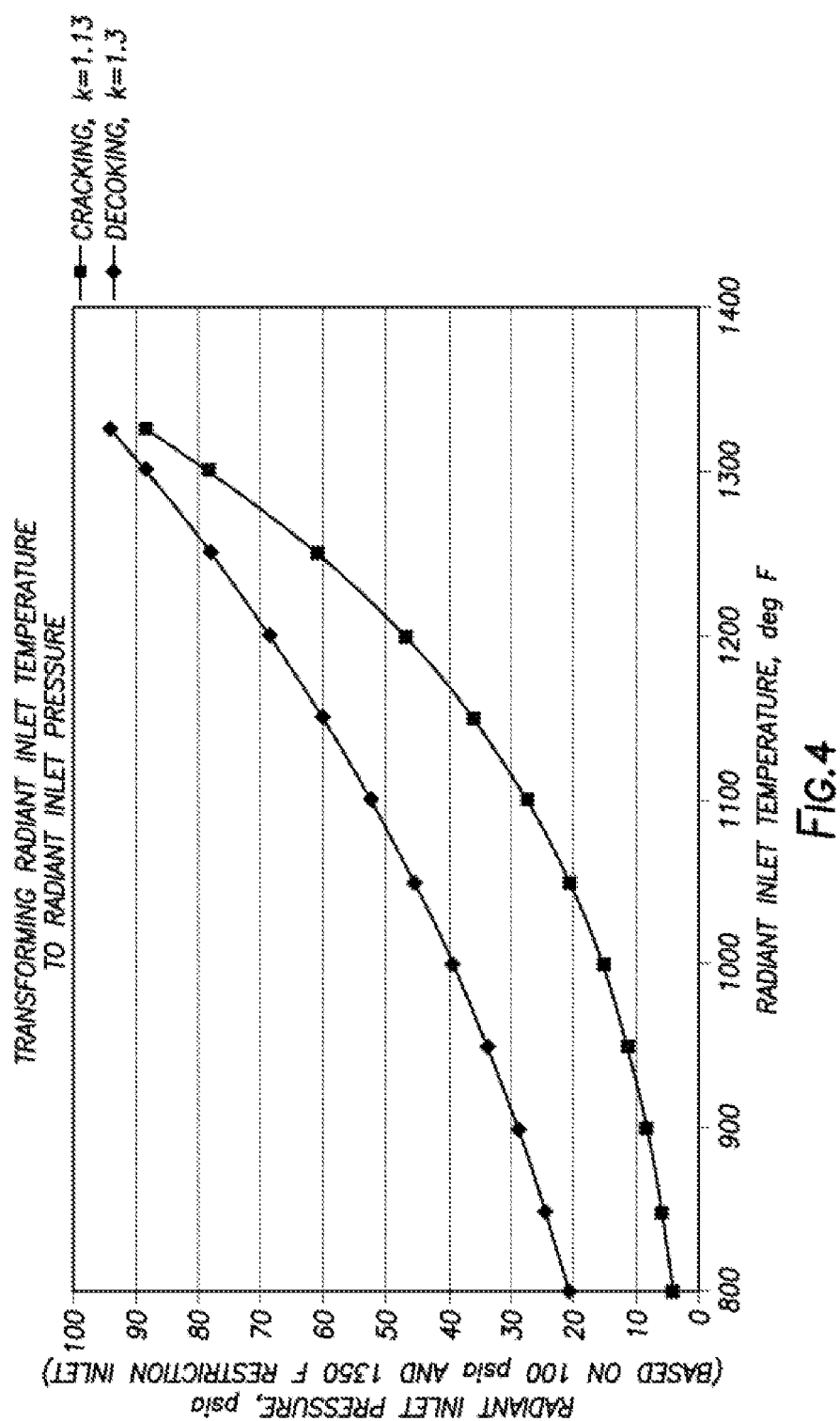

COKE MITIGATION IN HYDROCARBON PYROLYSIS

CROSS-REFERENCE OF RELATED APPLICATIONS

Priority

This application is a National Phase Application claiming priority to P.C.T. Patent Application Serial No. PCT/US2018/064286 filed Dec. 6, 2018, which claims priority to and the benefit of U.S. Provisional Application No. 62/611,863, filed Dec. 29, 2017, the disclosure of which are incorporated herein by reference.

FIELD OF INVENTION

The present invention generally relates to mitigating pyrolysis coke, to pyrolysis reactors adapted for such mitigation, and to the use of such mitigation in hydrocarbon pyrolysis processes.

BACKGROUND OF THE INVENTION

Pyrolysis reactors such as steam cracking pyrolysis reactors suffer from limitations due to coke accumulation in furnace tubes, e.g., in radiant tubes. During pyrolysis mode operation, a mixture of hydrocarbon feed and steam (commonly referred to as "dilution steam") is conducted to the radiant tubes for hydrocarbon pyrolysis. Coke accumulates in the radiant tubes during the pyrolysis, which in turn causes inefficiencies in the pyrolysis reaction. This effect is particularly troublesome in radiant tubes used for carrying out high-temperature pyrolysis reactions. The extent and rate of coke accumulation limits pyrolysis reactor reliability and operating conditions. Pyrolysis reactors typically employ a plurality of fluidically-parallel radiant tube assemblies per steam cracking furnace. Hence, a pyrolysis reactor reliability is frequently limited by coking inside one or more of the reactor tubes in each assembly. Accumulated coke is at least partially removed from the radiant tubes by periodically operating the steam cracker in decoking mode. During decoking mode, a decoking fluid such as air, steam, or a combination thereof is introduced into the tube to remove the coke. Since desired pyrolysis products are not produced during decoking mode, it is desired to decrease the rate of coke accumulation during pyrolysis mode and to decrease the duration of decoking mode. But without an indication of the amount of accumulated coke remaining in the radiant tube as pyrolysis mode progresses, it is difficult to ascertain when steps should be taken to decrease the rate of coke accumulation since these steps may decrease the yield of desired pyrolysis products or whether the radiant tube should be switched to decoking mode. Moreover, without an indication of the amount of accumulated coke remaining in the radiant tube as decoking mode progresses, it is difficult to ascertain the duration of decoking mode even if there is a target coke amount for the radiant tube at which the decoking should be ended.

Optimization against coke accumulation typically involves a determination of the coke accumulation rate in a furnace tube. One way to do this is by measuring pressure drop across a furnace tube, e.g., by direct pressure measurements through pressure instrumentation installed on the radiant tube's inlet. Since steam crackers typically employ one or more radiant tube assemblies, with each assembly having a plurality of fluidically-parallel radiant tubes, providing direct pressure measurement capabilities adds significant capital cost and complexity. Furthermore, in some steam cracker facilities, spacing constraints prevent use of such bulky instrumentation. The problem is further exacerbated when cracking certain liquid feeds, as a result of rapid fouling and obstruction of the direct radiant inlet pressure instrument.

A need exists for a method and system to monitor coke build-up in a pyrolysis reactor, tube-by-tube, but without the need for a capital-intensive solution and/or fouling-prone indications.

SUMMARY OF INVENTION

Presented herein are methods of optimizing a pyrolysis reaction comprising the steps of measuring an upstream temperature of a pyrolysis reactor, measuring a temperature downstream of the adiabatic restriction in the pyrolysis reactor, measuring an upstream pressure of the adiabatic restriction to provide an upstream pressure P1; determining a downstream pressure P2 using the formula: $P2=P1 \times (T2/T1)^{(k/k-1)}$, where k is between about 1.1 to about 1.4 during cracking, and performing one or more of the following steps: (a) adjusting cracking intensity of the pyrolysis reactor; (b) adjusting feed and fuel control valves to distribute coking rate in the parallel tube assembly; and/or (c) determining decoking time and adjusting the amounts of air, hydrocarbon feed and dilution steam to accelerate the amount of coke removal in the reactor or to adjust emissions from coke removal. The upstream temperature is measured upstream of an adiabatic restriction in the inlet manifold to provide an absolute upstream temperature T1. Temperature is measured downstream of the adiabatic restriction to provide an absolute downstream temperature T2.

As used herein, the term "absolute temperature" refers to temperature measured from absolute zero in Kelvin. As used herein, the term "absolute pressure" refers to pressure that has a zero reference, i.e. is not measured in gage. As used herein, the term "adiabatic" is used to refers to an insulation value of at least 0.7 hour-foot$^{2\circ}$ F./BTU (0.123 K m$^2$/W), e.g., at least 1.0 hour-foot$^{2\circ}$ F./BTU (0.176 K m$^2$/W), such as at least 1.5 hour-foot$^{2\circ}$ F./BTU (0.26 K m$^2$/W).

In an aspect, k can equal 1.13, from about 1.2 to about 1.4 and about 1.3 during cracking. Furthermore, k is the ratio of fluid specific heat at constant pressure (Cp) to fluid specific heat at constant volume (Cv). In certain aspects, the manifold is insulated.

As described herein, certain steam cracker reactors include one or more assemblies, with each assembly having a plurality of fluidically-parallel furnace tubes. The upstream end of each of the furnace tubes in the assembly can be fluidically-connected to an inlet manifold which is adapted to provide (i) hydrocarbon feed to each of the tubes in the assembly for hydrocarbon pyrolysis in the tubes during pyrolysis mode and (ii) a decoking fluid to each of the tubes in the assembly during decoking mode for removing coke from the tubes as may have accumulated during the pyrolysis. Although the flow through radiant tubes in a radiant tube assembly is parallel flow (i.e., "fluidically-parallel" flow through each of the radiant tubes in the assembly), the radiant tubes in a radiant-tube assembly (conventionally a "pass") do not have to be geometrically parallel with one another. However, a furnace tube assembly having a plurality of radiant tubes that are both geometrically parallel and fluidically parallel with one another is within the scope of the invention.

Although it is not required, it is typical to make an upstream temperature measurement ("T1"), an upstream pressure measurement ("P1"), and a downstream temperature measurement ("T2") for each radiant tube during pyrolysis mode and decoking mode. The upstream temperature and downstream temperature can be measured by an insulated skin thermowell. The temperature measurement T1 can be taken at substantially the same position in the flow of process fluid ("process flow") as the pressure measurement P1, at or upstream of the inlet manifold. Process flow can be substantially adiabatic through the restrictions feeding the parallel tube assembly. In an aspect, the measured upstream temperature T1 and downstream temperature T2 correlate to process flow pressure within each of the radiant tubes. In an aspect, process flow pressure downstream P2 indicates coke accumulation in the parallel tube assembly.

Further provided herein are systems for optimizing a pyrolysis reaction comprising a pyrolysis reactor having a parallel tube assembly comprising a plurality of radiant tubes; an insulated restriction at an inlet of each of the radiant tubes, where each restriction maintains substantially-uniform distribution of process flow among the radiant tubes, each restriction has a restriction inlet and a restriction outlet; and temperature measurement means, e.g., an insulated skin thermowell for measuring an temperature upstream of the restriction and a downstream temperature at the restriction outlet. In the present systems, the upstream and downstream temperatures are directly related to a process flow pressure downstream of the restriction, and the process flow pressure indicates accumulated coke in the reactor. In an aspect, each of the tubes are connected to an inlet manifold and an outlet manifold, and the inlet manifold is insulated.

In certain aspects, the steam cracking reactor is switched from pyrolysis mode to decoking mode (i.e., decoking can begin) when the difference between the upstream temperature and the downstream temperature is less than about 400° F. (204° C.). While not wishing to be bound by any theory or model, it is believed that downstream pressure P2 correlates directly with accumulated coke.

In certain aspects, when in pyrolysis mode a radiant tube exhibits a $P2 \geq F*P1$, with factor F being a positive real number in the range of from 0.5 to 0.9, then (i) additional steam is introduced into the radiant tube to decrease the rate of coke accumulation, i.e., steam in addition to the dilution steam that is present in the hydrocarbon+dilution steam mixture that is conducted into the radiant tube for the pyrolysis reaction; and/or (ii) the radiant tube is switched from pyrolysis mode to decoking mode to remove accumulated coke. In certain aspects, when during decoking mode a radiant tube exhibits a $P2 < G*P1$, where factor G is a positive real number in the range of about 0.1 to 0.5, the radiant tube is switched from decoking mode to pyrolysis mode. Although it is within the scope of the invention to switch one radiant tube in a radiant tube assembly from decoking mode to pyrolysis mode, and vice versa, it is typical to switch the entire radiant tube assembly containing the indicated tube at substantially the same time (e.g., simultaneously). It is also within the scope of the invention to switch at substantially the same time all of the radiant tube assemblies of the steam cracker from pyrolysis mode to decoking mode, and at a later time switch all of the radiant tube assemblies of the steam cracker from decoking mode back to pyrolysis mode.

In certain aspects, the increase in downstream process flow pressure is calculated via the adiabatic expansion correlation, $P2=P1 \times (T2/T1)^{(k/k-1)}$ wherein k is the ratio of fluid specific heat at constant pressure (Cp) to fluid specific heat at constant volume (Cv) and equals about 1.1 to about 1.4 during cracking, P1 is the upstream pressure, T1 is the upstream temperature and T2 is the downstream temperature. In an aspect, the upstream temperature and downstream temperature are measured, e.g., by an insulated skin thermowell.

BRIEF DESCRIPTION OF THE DRAWINGS

FIG. 4 is a graph showing the transforming of radiant inlet temperature to radiant inlet pressure.

DESCRIPTION OF THE PREFERRED EMBODIMENTS

Figure 1:
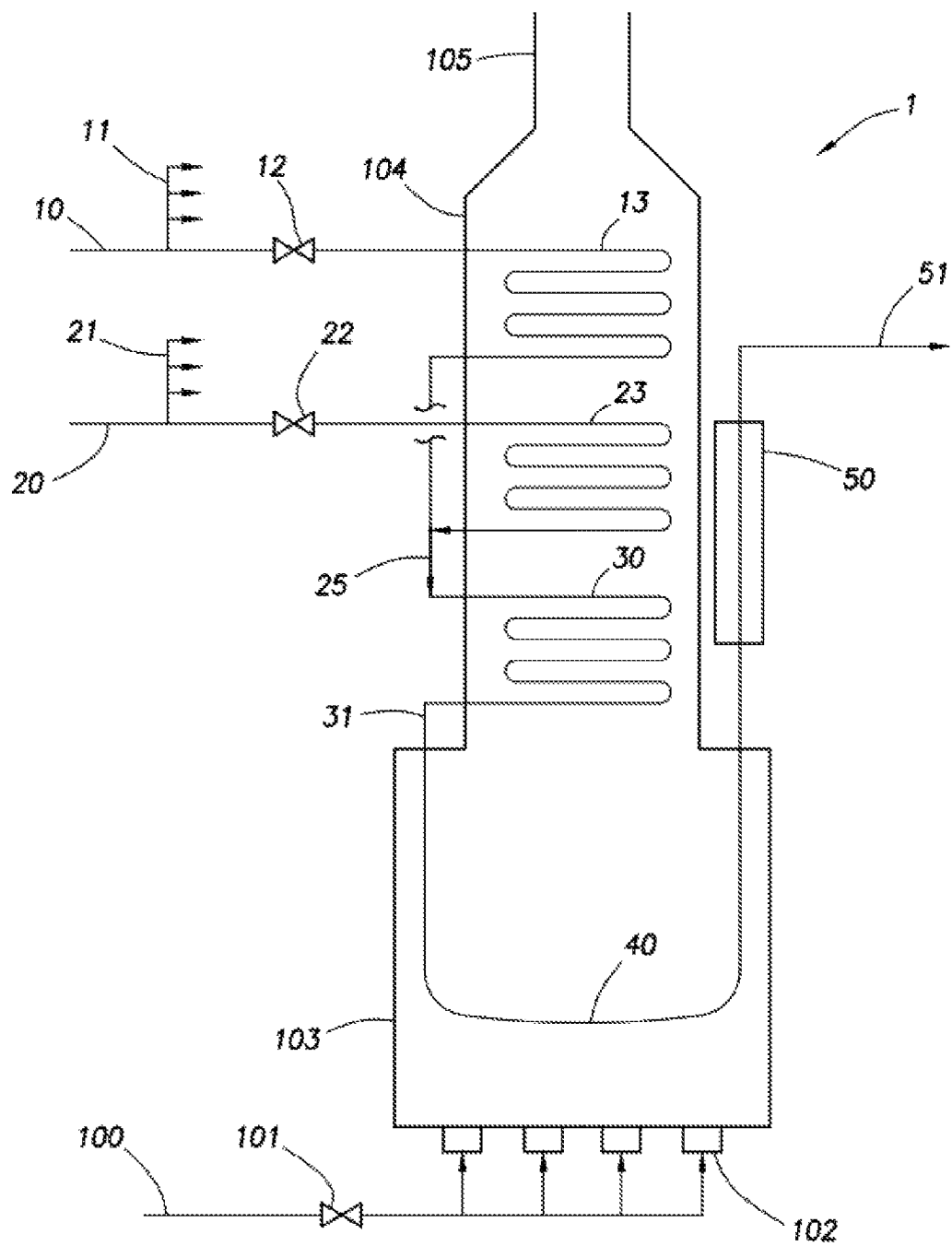
FIG. 1 depicts a steam cracking furnace as described herein.

Steam cracking is a process that produces light olefins, especially ethylene and propylene from hydrocarbon feeds. Light olefins are produced by the thermal cracking of a feed mixture comprising hydrocarbon and dilution steam, the thermal cracking being carried out at high temperatures and short residence times. Among other purposes, dilution steam is present in the feed mixture to decrease hydrocarbon partial pressure during the cracking reaction, which shifts equilibrium toward ethylene and propylene production but away from coke production.

Although it is not limited thereto, steam cracking as carried out in a conventional steam cracking furnace is within the scope of the invention. Conventional steam cracking furnaces (a form of pyrolysis furnace) have two main sections: a convection section and a radiant section. Typically, a hydrocarbon feed (also referred to sometimes as hydrocarbon feedstock) enters the convection section of the furnace as a liquid or as a gas and is heated and vaporized through indirect contact with hot flue gas from the radiant section, or by direct contact with injected dilution steam. The heated feed mixture comprising the hydrocarbon feed and dilution steam, now primarily in the vapor phase, is introduced into radiant tubes in the radiant section. The resulting products produced in the radiant tubes comprise (i) coke, at least a portion of which typically accumulates in the radiant tube, and (ii) olefins, which exit the furnace for further downstream processing such as quenching and recovery.

In pyrolysis mode, the hydrocarbon feed is preheated in the convection section, and is further heated by direct contact with the dilution steam to produce the heated feed mixture. Typically ≥75 wt. % of the heated feed mixture is in the vapor phase at the outlet of the convection section, e.g., ≥90 wt. %, such as ≥95 wt. %, or ≥99 wt. %. Exiting the convection section, the heated feed mixture (feed hydrocarbon+dilution steam) typically has a temperature in the range of from 500° C. to 750° C. However, in the convection section of the pyrolysis furnace, the temperature of the hydrocarbon can be as high as 790° C. During decoking mode, the amount and quality of steam in the decoking fluid can be controlled to moderate the decoking reaction(s). In certain aspects, steam is a moderating influence in the radiant tubes to prevent heating the tubes to a temperature beyond their thermal limit in both pyrolysis mode and decoking mode.

During pyrolysis mode, the heated feed mixture is passed from the convection section to the radiant section of the furnace for thermal cracking of the hydrocarbon. The heated feed mixture introduced into the radiant section can have a temperature in the range of about 425° C. to about 760° C. (about 800° F. to about 1400° F.), or about 560° C. to about 730° C. (about 1050° F. to about 1350° F.). The heated feed mixture is further heated in the radiant section to achieve a temperature in the range of from about 425° C. to about 760° C. (about 800° F. to about 1400° F.) under steam cracking process conditions (total pressure, hydrocarbon partial pressure, residence time, etc.) to produce the desired hydrocarbon product via at least thermal cracking. In one conventional thermal cracking process, the radiant tube has the form of a heat transfer tube which transfers from one or more burners in the steam cracker furnace to an exterior surface of the radiant tube. In other words, radiant heat is transferred from flames of the burner to the outer surface of the radiant tube. Alternatively, in other cracking processes, the hydrocarbon feed can be directly heated via flue gas produced in one or more burners, by radiant heat transfer from the interior surfaces of a firebox enclosure, by convective heat transfer from combustion gases traversing the radiant section, or the like. Subsequently, hydrocarbon product (olefins) are quenched in a quench system that includes a heat exchanger or injector for injection of a quench oil stream.

One Byproduct of the steam cracking process are carbon deposits, commonly referred to as "coke," on the inner surfaces of the radiant tubes. Depending on the hydrocarbon feed used to produce the feed mixture, coke may further deposit on other tubing, for example in the convection section or in the quench system of the furnace. Further, when feedstocks contain non-volatile hydrocarbons, coke depositions may occur on the internal surfaces of a separator, e.g., a separator that is integrated with the furnace's convection section for separating from the feed mixture at least a portion of such non-volatiles.

There is a limit to the quantity of coke that can be deposited in a furnace and still permit normal-range steam cracker furnace operation. Eventually, coke deposits insulate or clog the tubes to or beyond the point where efficient steam cracking can be carried out. Coke deposits are typically removed (e.g., by switching the furnace from pyrolysis mode to decoking mode) before any of the following events are reached: (1) maximum radiant tube metal temperature (TMT) is achieved or exceeded; (2) maximum radiant coil pressure drop is achieved or exceeded; (3) maximum convection section pressure drop is achieved or exceeded; (4) maximum quench system pressure drop is achieved or exceeded; or, (5) in the case where the furnace effluent is quenched in a steam generating quench exchanger, the maximum quench exchanger outlet temperature is achieved or exceeded.

During pyrolysis mode, especially when using relatively heavy hydrocarbon feeds (e.g., a feed comprising resid) coke accumulates on the internal surfaces of the radiant tubes and reduces the effective cross-sectional area of the tube. This in turn leads to a need for an increase in feed mixture pressure to maintain a constant radiant tube throughput. Since coke is an effective insulator, its formation on tube walls may lead to a need for an increase in furnace tube temperature, e.g., to maintain cracking efficiency. High operating temperatures, however, result in a decrease in tube life, limiting the practical temperature that can be employed, as well as the ultimate conversion and yield.

Even with relatively light hydrocarbon feeds such as ethane, over time an undesirable but largely unavoidable byproduct of the cracking process is the deposition of carbon deposits ("coke") on the inner surfaces of the radiant tubes of furnace. Depending on the feedstock being cracked, coke may also be deposited in the convection tubes of convection section, or in the quench system of furnace. For feedstocks containing non-volatile hydrocarbons, commonly referred to as asphaltenes, residue ("resid"), or pitch, which are processed in a furnace in which the convection section is equipped with an intermediate vapor-liquid separator, e.g., for separating non-volatiles, coke deposition may also occur on the internal surfaces of the separator. The invention is based in part on the development of a coke mitigation system and process which utilizes temperature measurements proximate to the radiant tube's inlet to detect a pressure drop increase across the radiant tube without the need for a direct pressure measurement in the radiant tube. An indication of a pressure increase in the radiant tube, which is strongly correlated with coke accumulation, provides the operator of a steam cracker furnace with the information needed to determine whether (i) the coke accumulation rate in the radiant tube during pyrolysis mode should be lessened, e.g., by introducing additional steam into the radiant tube, (ii) the furnace should be switched from pyrolysis mode to decoking mode, and/or (iii) during decoking mode whether the targeted (and typically pre-determined) amount of coke removal from the tube has occurred, or whether continuation of decoking mode is needed to achieve the targeted amount of coke removal.

The present systems and methodologies utilize a temperature measurement, e.g., from a thermocouple or more typically from a compact insulated skin thermowell within the steam cracking furnace, to indicate the pressure inside the radiant tube P2. Certain steam cracking furnaces have at least one radiant tube assembly which includes a plurality of fluidically-parallel radiant tubes fed, with each of the tubes being fed from an inlet manifold. Flow restrictions can be used as an aid in achieving a substantially-similar flow rate of process flow (heated feed mixture during pyrolysis mode and decoking fluid during decoking mode, as the case may be) among the radiant tubes in the assembly. Typically, a sufficient flow restriction (e.g., a sufficiently-restrictive nozzle) is used to substantially-equalize process flow among the radiant tubes in the assembly, and for other purposes, e.g., to achieve a desired flow rate or flow behavior (turbulent or laminar). The present methods and systems take advantage of this feature. Where this restriction is insulated for heat conservation, the flow restriction process can occur adiabatically. Accordingly, the pressure change across the restriction correlates in a predictable proportional manner to the temperature change across the restriction as follows:

$$P2=P1*(T2/T1)^{k/(k-1)}, \text{ where}$$

P2=absolute pressure downstream of the adiabatic restriction (desired unknown);

P1=absolute pressure upstream of the adiabatic restriction (measured through direct pressure instrument or inferred from flow rates);

T2=absolute temperature downstream of the adiabatic restriction (measured through insulated skin thermowell);

T1=absolute temperature upstream of the adiabatic restriction (measured through immersion or insulated skin thermowell); and k=Ratio of fluid specific heat at constant pressure (Cp) to specific heat at constant volume (Cv). (i.e., k=Cp/Cv).

Using the above correlation, and existing upstream temperature and pressure measurements or inferences available on pyrolysis reactors which include radiant tubes (most if not all conventional steam crackers, for example), the process fluid temperature downstream of the restriction can indicate the process fluid pressure just downstream of the restriction. Pressure measurement can be a gauge pressure measurement (pressure above atmospheric pressure), which is readily converted to an absolute pressure for use in the formula described above. An insulated skin thermowell can be used to indicate temperature inside of pyrolysis reactor tubes. The process fluid pressure just downstream of the restriction indicates the built-up of a backpressure resulting from coke accumulation. It has been found that the backpressure correlates directly with the amount of accumulated coke.

Using a process control system in conjunction with temperature-inferred pressure data from each radiant tube of the steam cracking furnace, the cracking process can be optimized. For example, feed and fuel control valves can be used to manage coking rates in each tube to meet planned timing of pyrolysis mode and decoking mode cycles, for more precise coordination of maintenance and decoke schedules. During pyrolysis mode, these steps substantially align coking rates among all radiant tubes fed from the inlet manifold so that switching to decoking mode occurs when all of the radiant tubes require decoking, not just one tube in the assembly. In addition, the feed and fuel control valves and decoke timing can limit total coke buildup to levels that prevent tube damage from contraction over coke. These steps prevent coke from reaching damaging levels on a tube in the furnace.

Those skilled in the art will appreciate that cracking intensity can be determined by the selected steam cracking conditions and/or specific process parameters such as retention time, temperature, and/or dilution, ethane disappearance (conversion), propane disappearance (conversion), methane over propylene ratio, propylene over methane ratio, ethylene over propylene ratio, or propylene over ethylene ratio, or radiant tube (also called "radiant coil") outlet temperature. Although conventional methods can be used for calculating cracking intensity, the invention is not limited thereto. In certain aspects, cracking intensity is determined from measurements of process parameters, e.g., from feed conversion measurements (direct and/or indirect). Cracking intensity can be adjusted by regulating the furnace's firing rate and/or coil outlet temperature. In certain aspects, cracking intensity is adjusted by regulating the flow into the furnace tube of added steam, steam, feed, and dilution steam. Alternatively or in addition, cracking intensity can be adjusted by regulating the flow of burner fuel and/or burner firing rate, or less commonly, the pressure subsisting downstream of the radiant tube. These parameters are readily adjusted after the furnace is designed, even during a given furnace run. For example, with indication of pressure (and effectively coke accumulation) on each tube, advanced controls can increase temperatures on the radiant tubes to provide consistent cracking intensity across the furnace and plant.

Similar process-control techniques can be used during decoking mode, in conjunction with this temperature-inferred pressure data for each radiant tube. Doing so has been found to optimize decoking mode operation, e.g., by decreasing the total time duration of a decoking mode cycle. The intensity of decoking reactions in the radiant tube during decoking mode can be adjusted by regulating (i) the amount of oxidant (typically oxygen, air, or oxygen in air) in the decoking fluid and (ii) the amount and quality of steam in the decoking fluid. Alternatively or in addition, the amount of burner fuel and burner firing rate can be regulated to adjust decoking intensity in response to the specified temperature-inferred pressure values. Doing so can be used to determine the amount of coke remaining in a radiant tube after a period of decoking (even indicating the complete removal of coke from a radiant tube), which an operator can use to regulate the duration of a decoking cycle.

Using the temperature-inferred pressure data from each tube, erosion life, tube life and decoking emissions are managed more precisely. Coke accumulation over multiple decoke cycles per temperature-inferred pressure indication can be used to estimate total component erosion to plan replacement of affected tube outlet fittings just-in-time before failure. By comparing the amount of coke collected from decoke effluent coke collection devices to the coke accumulated per temperature-inferred pressure indications, the total coke gasification (and emissions) can be estimated. Furthermore, the process control system, through steam, air, and, fuel controls, can adjust the decoking process to reduce emissions.

Certain aspects of the invention are based in part on the discovery that the restrictions of flow distribution among fluidically-parallel radiant tubes in a typical radiant tube assembly results in an adiabatic expansion of process fluid into each radiant tube in the assembly. Temperatures across the restriction correlate predictably with the pressures across the restriction. Skin thermowells provide accurate process temperature inside a radiant tube at a lower cost. Furthermore, the pressure just downstream of the restriction has long been understood as an indication of coke thickness inside the tubes. Hence, the combination of the gas laws surrounding the adiabatic process, skin thermowell experience, and radiant inlet pressure indication experience provides the solution to the problem of coke accumulation and allows an operator to effectively mitigate this problem.

The invention will now be described in more detail with respect to a pyrolysis process that is a form of a steam cracking process operating cyclically in pyrolysis mode and decoking mode. The invention is not limited to this form, and this description should not be interpreted as foreclosing other forms of pyrolysis processes.

Steam Cracking Process

The steam cracking furnace 1 schematically represented in FIG. 1 includes as its primary components a radiant section 103 and a convection section 104. The convection section 104 and radiant section 103 each contain heat transfer tubes: convection tubes (commonly called convection coils) 13, 23, and 30, and radiant tubes 40. The heat transfer tubes are typically made from carburization resistant alloy. The radiant section 103 also contains at least one burner 102 to heat a hydrocarbon feed. Typically the steam cracker includes a plurality of fluidically-parallel radiant tubes arranged in an assembly (a pass), with each radiant tube in the pass typically being fluidically-connected to an inlet manifold (not shown in FIG. 1) at the tube's upstream end and an outlet manifold (not shown in FIG. 1) at the tube's downstream end. Typically, a steam cracker furnace comprises a plurality of passes (not shown in FIG. 1). The temperature of the hydrocarbon feed is rapidly raised to a desired coil outlet temperature (COT, at the downstream end of radiant tube 40), ranging from about 1450° F. (788° C.) for some very heavy gas oil feeds to about 1650° F. (871° C.) or even 1700° F. (927° C.) for ethane or propane feeds. Selectivity to light olefins during pyrolysis mode is favored by short contact time, high temperatures, and low hydrocarbon partial pressures. For this reason radiant tubes typically operate at a temperature (measured at the tube metal) as high as 2050° F. (1121° C.). Typically, steam cracking conditions in the radiant section include, e.g., one or more of (i) a temperature in the range of 700° C. to 900° C.; (ii) a pressure in the range of from 1.0 to 5.0 bars (absolute); and (iii) a cracking residence time in the range of from 0.10 to 2.0 seconds.

Continuing with reference to FIG. 1, a heated feed mixture comprising hydrocarbon and steam is indirectly heated in radiant tube 40 in radiant section 103. In a typical steam cracking furnace, substantially all of the radiant tubes of a pass are indirectly heated in the radiant section, primarily through the transfer of heat from one or more burners to the exterior surface of each tube. For example, radiant heat transfer is produced from flames and high temperature flue gas produced in one or more burners, from the interior surfaces of a firebox enclosure, by convective heat transfer from combustion gases traversing the radiant section, and the like.

Heat transferred to the hydrocarbon feed located in the radiant tube results in thermal cracking of at least a portion of the hydrocarbon to produce an effluent from the radiant tube (a "radiant coil effluent", not shown) comprising molecular hydrogen, light olefin, other hydrocarbon-containing products of pyrolysis reactions (including products of cracking reactions), unreacted steam, and unreacted hydrocarbon feed. Transfer line piping is typically utilized for conveying radiant coil effluent from the radiant section of the steam cracking furnace 1 to a heat-transfer stage for effluent cooling, e.g., from an outlet manifold of a pass to one or more of a quench header, transfer-line heat exchanger(s), etc. Coke accumulates during the thermal cracking accumulates on internal surfaces of the radiant tubes. After an undesirable amount of coke has accumulated, the steam cracking furnace is switched from pyrolysis mode to decoking mode. During decoking mode, a flow of decoking fluid, typically comprising a mixture of air and steam mixture, is conducted through the steam cracker (e.g., through the radiant tubes, for removing accumulated coke. Decoking effluent is conducted away from the radiant tubes, typically via the same heat transfer equipment utilized during pyrolysis mode. Cooled decoking effluent is conducted away from the process, typically for further processing such as coke separation. After a sufficient amount of coke (typically a predetermined amount) has been removed from the radiant tubes in each pass, the steam cracking furnace is switched back to pyrolysis mode. Following coke removal, the flow of hydrocarbon feed is restored to the at least partially-decoked radiant tubes. The process continues, with alternating pyrolysis (thermal cracking) mode and decoking mode. The radiant tubes experience significant mechanical stress as they expand and contract between the alternating cracking and decoking process modes. The tubes experience even more mechanical stress when a furnace shutdown/startup is required. An aspect of the invention mitigates this problem by e.g., (i) decreasing the rate of coke accumulation in a pass that exhibits a greater accumulation of coke during pyrolysis mode than other passes in the steam cracking furnace, e.g., by injecting added steam into the radiant tubes in the more-heavily coked pass, and/or (ii) carrying out decoking mode under moderated conditions and/or for no longer a time than is needed to achieve a predetermined amount of decoking in the passes. Decoking conditions typically include (i) utilizing an air-steam mixture as a decoking fluid, (ii) using dilution steam as the steam source, (iii) using an air to steam weight ratio in the range of from 0.25 to 1, e.g., 0.3 to 0.9, (iii) a radiant tube outlet pressure in the range of about 0.5 bar gauge to 2 bar gauge, e.g., 0.8 bar gauge to 1.8 bar gauge, and (iv) a COT in the range of from 880° C. to 930° C.

Certain hydrocarbon feeds that are useful for steam cracking processes will now be described in more detail. The invention is not limited to these feed, and this description should not be interpreted as foreclosing the use of other hydrocarbon-containing feeds within the broader scope of the invention. Any hydrocarbon-containing feed that can produce light olefin by steam cracking can be provided as the hydrocarbon feed.

Hydrocarbon Feeds

In certain aspects, the hydrocarbon feed comprises relatively high molecular weight hydrocarbons ("Heavy Feedstocks"), such as those which produce a relatively large amount of steam cracker tar during steam cracking. Examples of Heavy Feedstocks include one or more of steam cracked gas oil and residues, gas oils, heating oil, jet fuel, diesel, kerosene, coker naphtha, steam cracked naphtha, catalytically cracked naphtha, hydrocrackate, reformate, raffinate reformate, Fischer-Tropsch liquids, Fischer-Tropsch gases, distillate, crude oil, atmospheric pipestill bottoms, vacuum pipestill streams including bottoms, wide boiling range naphtha to gas oil condensates, heavy non-virgin hydrocarbon streams from refineries, vacuum gas oils, heavy gas oil, naphtha contaminated with crude, atmospheric residue, heavy residue, $C_4$/residue admixture, naphtha/residue admixture, gas oil/residue admixture, and crude oil. For example, the hydrocarbon can have a nominal final boiling point of at least about 600° F. (315° C.), generally greater than about 950° F. (510° C.), typically greater than about 1100° F. (590° C.), for example greater than about 1400° F. (760° C.). Nominal final boiling point means the temperature at which 99.5 wt. % of a particular sample has reached its boiling point at a pressure of 1 bar absolute.

In other aspects, the hydrocarbon comprises one or more relatively low molecular weight hydrocarbon (Light Feedstocks), particularly those aspects where relatively high yields of $C_2$ unsaturates (ethylene and acetylene) are desired. Light Feedstocks typically include substantially saturated hydrocarbon molecules having fewer than five carbon atoms, e.g., ethane, propane, and mixtures thereof. The heat transfer tubes of the invention are particularly useful for steam cracking Light Feedstock, and more particularly as radiant tubes for the steam cracking of ethane.

In another aspect, the hydrocarbon comprises, consists essentially of, or even consists of naphtha boiling-range hydrocarbon. For example, the hydrocarbon can comprise naphtha as a major (e.g., greater than 50 wt. %) component ("Naphtha Feedstocks"). Naphtha Feedstocks can comprise a mixture of $C_5$ to $C_{10}$ hydrocarbons, for example $C_5$ to $C_8$ aliphatic hydrocarbons.

Certain aspects of the invention which include conducting the selected feed to a form of steam cracking furnace for carrying out forms of a steam cracking process will now be described with reference to FIG. 1. The invention is not limited to these forms, and this description should not be interpreted as foreclosing other steam cracking furnace forms or other pyrolysis reactor forms within the broader scope of the invention.

Steam Cracking Furnace

As shown in FIG. 1, steam cracking furnace 1 includes a radiant section 103, a convection section 104 and flue gas exhaust stack 105. Fuel gas is provided via fuel gas conduit 100 and control valve 101 to a plurality of burners 102 to provide radiant heat to the furnace during pyrolysis mode and decoking mode, e.g., to heat feed mixture in a radiant tube during pyrolysis mode to produce the desired pyrolysis products by pyrolysis reactions, including thermal cracking of the feed mixture's hydrocarbon. The plurality of burners generate hot gas that flows upward through the convection section 104 and then away from the furnace 1 via conduit 105.

Hydrocarbon feed enters the steam cracking furnace 1 via hydrocarbon feed conduit 10 and hydrocarbon feed valve 12 to at least one convection coil 13. Hydrocarbon feed introduced into convection coil 13 is preheated by indirect contact with hot flue gas. The hydrocarbon feed valve 12 is used to regulate the amount of hydrocarbon feed introduced into convection coil 13. Convection coil 13 is typically one of a plurality of convection coils that are arranged in a first coil bank for parallel flow of hydrocarbon feedstock. Typically, the plurality of hydrocarbon feed conduits 10 convey hydrocarbon feed to each of the parallel convection coils of the first coil bank. By way of example, four feed conduits are represented in FIG. 1. However, the convection section can have 3, 4, 6, 8, 10, 12, 16, or 18 feed conduits for conveying fluidically-parallel portions of a total hydrocarbon feed to an equivalent number of convection coils located in the first coil bank. Although not shown, each of the plurality of feed conduits 11 may be provided with a valve (similar to hydrocarbon feed valve 12). In other words, each of the plurality of conduits 11 can be in fluidic communication with a convection coil (not shown) that (i) is located in the first coil bank and (ii) operates in parallel with convection coil 13. For simplicity, the description of the first convection coil bank will focus on convection coil 13. The other convection coils in the bank can be operated in a similar manner.

Dilution steam is provided via dilution steam conduit 20 through dilution steam conduit valve 22 to dilution steam convection coil 23 for preheating by indirect transfer of heat from flue gas. Dilution valve 22 is used to regulating the amount of dilution steam introduced into the dilution steam convection coil 23. Dilution steam convection coil 23 is typically one of a plurality of convection coils that are arranged in a second coil bank for parallel dilution steam flow. A plurality of dilution steam conduits 20 can convey dilution steam to each of the parallel convection coils of the second coil bank. Four dilution steam conduits are shown in FIG. 1. However, convection sections having 3, 4, 6, 8, 10, 12, 16, or 18 dilution steam conduits for conveying in parallel portions of an amount of total dilution steam to an equivalent number of convection coils located in the second convection coil bank can be provided. Although not shown, each of the plurality of dilution steam conduits 21 can be provided with a valve (similar to dilution steam valve 22). In other words, each plurality of conduits is in fluid communication with a convection coil (not shown) operating in parallel with dilution steam convection coil 23.

Preheated dilution steam and preheated hydrocarbon feed are combined in or proximate to hydrocarbon steam conduit 25. A feed mixture comprising hydrocarbon and dilution steam is reintroduced into convection section 104 via one or more feed conduits 25 to preheat the feed mixture in convection coil 30. Convection coil 30 is typically one of a plurality of convection coils that are arranged in a third coil bank for parallel flow of the hydrocarbon+steam mixture during pre-heating. One convection coil for pre-heating hydrocarbon steam mixture is represented in FIG. 1. However, 3, 4, 6, 8, 10, 12, 16, or 18 hydrocarbon steam mixture convection coils can be used for conveying in parallel portions of a total amount of feed mixture. The feed mixture can be preheated in convection coil 30, for example to a temperature in the range of about 750° F. to 1400° F. (400° C. to 760° C.). The temperature of the heated convection coil 30 is generally designed to be at or near the point where significant thermal cracking commences.

Figure 2:
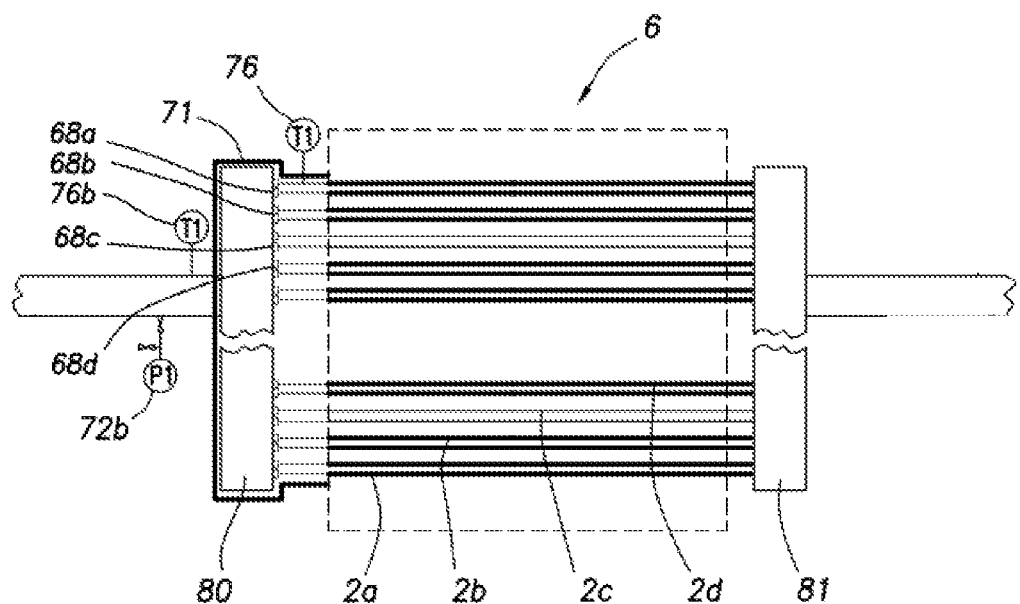
FIG. 2 shows a pyrolysis reactor parallel tube assembly.

Cross-over piping 31 is used for conveying preheated hydrocarbon steam mixture to radiant coil 40 for steam cracking under steam cracking process conditions. Although it is not required, it is typical for the cross-over piping to introduce the pre-heated feed mixture into an inlet manifold which is configured to divide the pre-heated feed mixture among a plurality of radiant tubes comprising a pass, instead of an individual radiant tube as shown in FIG. 1. Referring now to FIG. 2, cross-over piping conveying pre-heated feed mixture to the inlet manifold 80 is typically configures with temperature measurement means T1 (typically a form of thermocouple or form of thermowell), and pressure measurement means P1 (typically a form of manometer). The inlet manifold conducts pre-heated feed mixture from the cross-over piping into a plurality of radiant tubes 2a, 2b, 2c, 2d in the assembly (a pass).

Steam cracking process conditions, such as the amount of feed pre-heating, the amount of steam pre-heating, the amount of hydrocarbon steam mixture pre-heating, the relative amount of hydrocarbon feed and dilution steam, the temperature, pressure, and residence time of the preheated hydrocarbon steam mixture in radiant coil 40 (e.g., in the form of the pass of FIG. 2), and the duration of the first time interval (the duration of pyrolysis mode in coils 13, 23, 30, and 40) typically depend on the composition of the hydrocarbon feed, yields of desired products, and the amount of coke accumulation in the furnace (particularly in radiant coils) that can be tolerated.

After the desired degree of thermal cracking has been achieved in the radiant section 103, the furnace effluent is rapidly cooled in cooling stage 50. Any method of cooling the furnace effluent may be used. In one aspect, cooling stage 50 comprises at least a primary transfer line exchanger (TLE). For hydrocarbon feeds which comprise liquid hydrocarbon, e.g., heavier naphthas and all gas-oil feeds, a direct oil quench connection is often required downstream of the primary TLE. The oil quench connection allows addition of quench oil into the pyrolysis product stream to provide heat transfer from the product stream directly to the injected quench oil. For this purpose, a quench medium, such as quench oil, is injected into the effluent via at least one fitting adapted for this purpose. Additional quenching stages can be utilized in cooling stage 50, and these stages can be operated in series, parallel, or series-parallel. Cooled furnace effluent exits via a cooled fluid effluent conduit 51 for separation and/or processing, e.g., for removing ethylene and/or propylene from the furnace effluent.

Parallel Radiant Tube Assembly

The present systems and methods utilize a temperature measurement, e.g., from an insulated skin thermowell, to indicate the pressure inside a radiant tube. The radiant tube can be an individual radiant tube (e.g., tube 40 of FIG. 1, or can be one of a plurality of radiant tubes in a pass, as shown in FIG. 2. This temperature measurement can be made in substantially the same location as a pressure instrument would be installed in prior art reactors.

The steam cracking furnace utilizes a restriction at the inlet of each radiant tube to aid in flow distribution. The restriction is insulated for heat conservation and the flow restriction process occurs adiabatically. Accordingly, the pressure change across the restriction correlates in a predictable proportional manner to the temperature change across the restriction:

$$P2 = P1 * (T2/T1)^{(k/(k-1))}, \text{ where}$$

P2=absolute pressure downstream of the adiabatic restriction (desired unknown)

P1=absolute pressure upstream of the adiabatic restriction (measured through direct pressure instrument or inferred from flow rates)

T2=absolute temperature downstream of the adiabatic restriction (measured through insulated skin thermowell)

T1=absolute temperature upstream of the adiabatic restriction (measured through immersion or skin thermowell)

k=Ratio of fluid specific heat at constant pressure (Cp) to specific heat at constant volume (Cv). (i.e. k=Cp/Cv)

Using existing upstream temperature and pressure measurements or inferences available on the pyrolysis reactors combined with the above adiabatic expansion correlation, the process fluid temperature downstream of the restriction can indicate the process fluid pressure just downstream of the restriction. The insulated skin thermowell can provide this temperature similar to existing applications using insulated skin thermowells to infer temperature inside of pyrolysis reactor tubes. The process fluid pressure just downstream of the restriction indicates the built-up backpressure, which correlates directly with accumulated coke.

More particularly, as shown in FIG. 2, the parallel tube assembly indicated by reference no. 6 is shown as part of the pass. The parallel tube assembly typically has 2 to 40 radiant tubes per inlet manifold. Each furnace tube coveys its effluent into outlet manifold 81, and the combined effluent is conducted away from outlet manifold 81 via piping as shown.

Figure 3A:
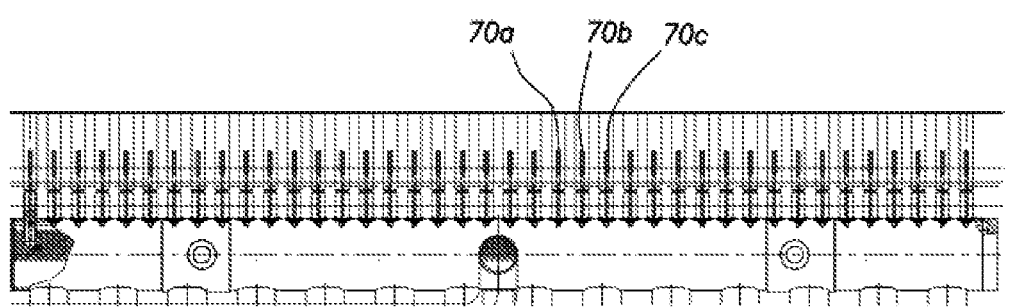
FIGS. 3A and 3B show a coil inlet skin thermowell.
Figure 3B:
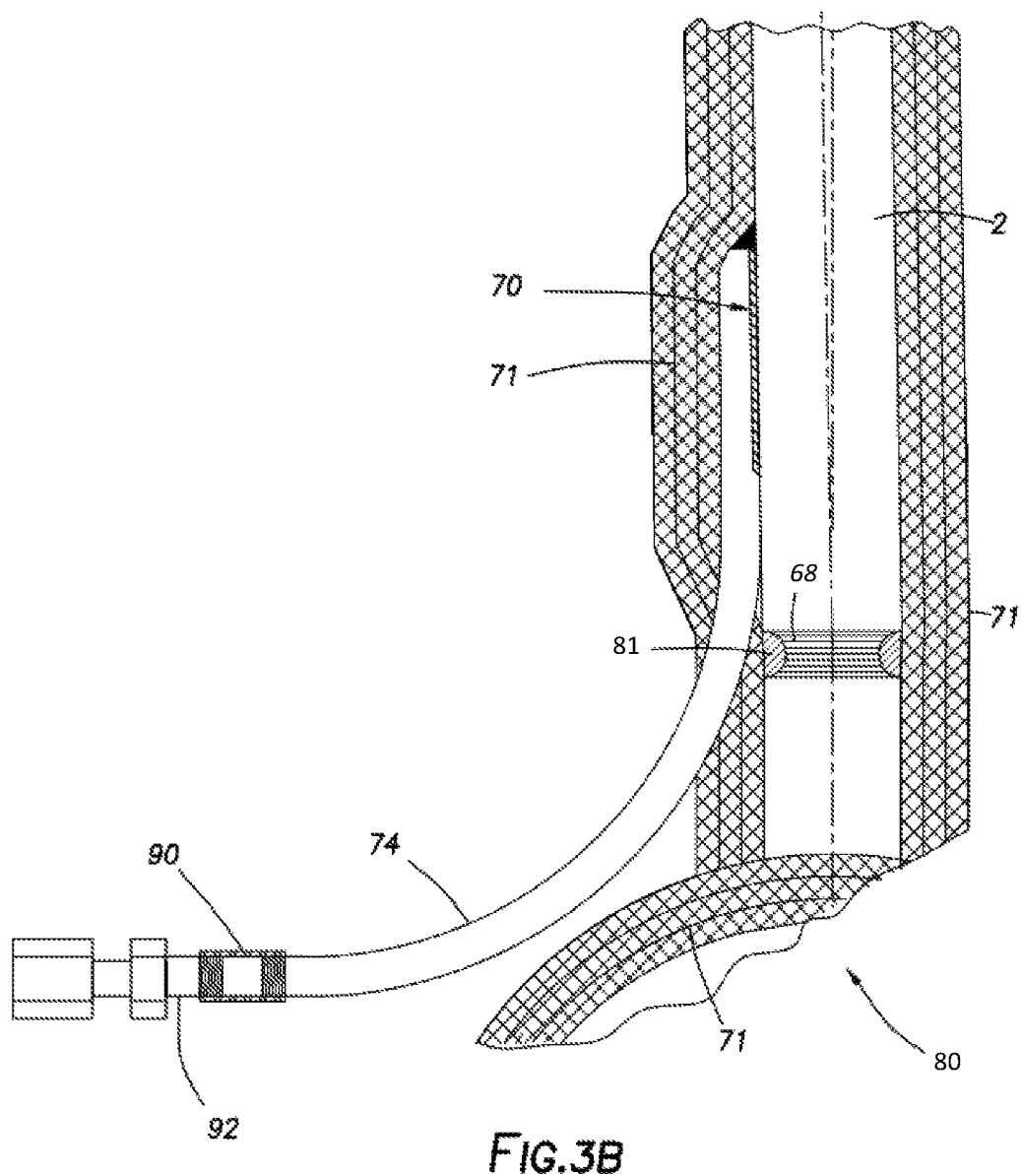

Each adiabatic restriction 68 in the inlet manifold 80 aids flow distribution. Insulation 71 around inlet manifold 80, around each restriction 68, and around each radiant tube's thermowell (not shown in FIG. 2, but located proximate to restrictions 68) aids in making the restrictions more adiabatic and the process temperature indications more accurate. The skin thermowells (not shown), pressure indicators 72b, and temperature indicators 76b (gauge and/or transmitted) are used to infer pressure drop and coke thickness using the specified adiabatic restriction relationships. Even more particularly, FIGS. 3A and 3B provide an aspect of the skin thermowell as described herein. FIG. 3A is a cross-sectional view of a plurality of skin thermowells 70a, 70b, 70c, etc. as welded on each radiant tube 2 in plurality of tubes 6. As shown in FIG. 3A, each radiant tube is fluidically connected to the inlet manifold as shown on the lower left. Cross-over piping inlet is shown at the center of the manifold, and mounting brackets are shown proximate to fight and left hand ends of the manifold. FIG. 3B is the skin thermowell 70 detail depicting the inlet manifold 80. An extension tube 92, coupling 90 and thermowell sheath 74 are also shown. Adiabatic flow restriction 68 is attached to radiant tube 2 by weld 81. Compliant members (not shown) allow for a certain amount of angular mis-alignment between the centerline of radiant tube 2 and the centerline of the pass as indicated by the diverging centerlines.

As shown in FIG. 4 and described herein, the use of the specified correlation to transform radiant inlet temperatures into radiant inlet pressures during both pyrolysis mode and decoking mode can be used to optimize reactor operations. As described herein, the coking rate is managed among the radiant tubes during pyrolysis mode, e.g., so that switching of the furnace to decoking mode does not occur until after a pre-determined coke thickness in the radiant tube is achieved. During decoking mode, the decoking conditions are moderated to lessen the amount of damage to the radiant tubes as may otherwise occur, and the rate of coke removal controlled and optimized using real-time data from specified temperature and pressure instrumentation so that the duration of decoking mode does not substantially exceed the time needed to achieve the desired amount of decoking. In certain aspects, when in pyrolysis mode a radiant tube exhibits a $P2 \geq F*P1$, with factor F being a positive real number in the range of from 0.5 to 0.9, e.g., from 0.6 to 0.9, such as from 0.7 to 0.9. Or 0.8 to 0.9, then (i) additional steam is introduced into the radiant tube to decrease the rate of coke accumulation, i.e., steam in addition to the dilution steam that is present in the hydrocarbon+dilution steam mixture that is conducted into the radiant tube for the pyrolysis reaction; and/or (ii) the radiant tube is switched from pyrolysis mode to decoking mode to remove accumulated coke. In certain aspects, when during decoking mode a radiant tube exhibits a $P2<G*P1$, where factor G is a positive real number in the range of about 0.1 to 0.5, e.g., 0.1 to 0.4, such as 0.1 to 0.3, or 0.1 to 0.2, the radiant tube is switched from decoking mode to pyrolysis mode.

By using a process control system in conjunction with the specified temperature-inferred pressure measurements for each radiant tube during pyrolysis mode, the process can be optimized through one or more methodologies. For example, the feed and fuel control valves can be used to manage coking rates in each tube to meet a planned (i.e., predetermined) start time for switching to decoking mode, which allows for more precise coordination of maintenance and decoking schedules. This methodology aligns coking rates among all tubes so that the steam cracking furnace is switched to decoking mode when all radiant tubes (or at least a majority) require decoking, not just one tube in a furnace or portion of a furnace. Doing so significantly increasing furnace availability for producing desired products such as ethylene and propylene, which during decoking mode are typically produced in very small amounts or not at all. Alternatively or in addition, the feed and fuel control valves and the timing of decoking modes are used to limit total coke buildup to levels that prevent tube damage from contraction over coke. This method prevents coke from reaching damaging levels on any tube in the furnace, significantly reducing furnace downtime for maintenance and increasing furnace availability. The specified indication of pressure (and effectively coke accumulation) on each radiant tube in combination with advanced controls can regulate the temperature of coked radiant tubes to provide more consistent cracking intensity across the furnace and plant.

It is a feature of the invention that both pyrolysis mode and decoking mode can be optimized. During decoking mode, a process control system can be used in conjunction with the specified temperature-inferred pressure data for each radiant tube to more effectively optimize coke removal. For example, air, steam, and fuel control valves are manipulated to accelerate removal of coke as indicated by temperature-inferred pressure to minimize decoking time, significantly increasing furnace availability. Alternatively or in addition, the specified temperature-inferred pressure can be used to signal that decoking mode can be ended when a at least a predetermined amount of coke has been removed from each furnace tube or from each pass of furnace tubes. This reduces or eliminates wait-time for more manual, subjective, field-based decisions on end of decoking mode, significantly reducing the duration of decoking mode and increasing furnace availability. It is a feature of the invention that the specified temperature-inferred pressure data for each radiant tube, can be used to manage more efficiently erosion life, tube life and decoking emissions. For example, coke accumulation over multiple cycles of decoking mode per use of the specified temperature-inferred pressure indication can be used to estimate total component erosion to plan replacement of affected tube outlet fittings just-in-time before failure. By comparing coke collected from decoke effluent coke collection devices to the coke accumulated per the temperature-inferred pressure indications, the total coke gasification (and emissions) is estimated. The process control system, through steam, air, and, fuel controls, can manipulates the decoking process to reduce emissions.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the invention, including all features which would be treated as equivalents thereof by those skilled in the art to which the invention pertains.

All documents described herein are incorporated by reference herein for purposes of all jurisdictions where such practice is allowed, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention.

Accordingly, it is not intended that the invention be limited thereby. Unless otherwise stated, all percentages, parts, ratios, etc. are by weight. Unless otherwise stated, a reference to a compound or component includes the compound or component by itself, as well as in combination with other compounds or components, such as mixtures of compounds. Likewise, the term "comprising" is considered synonymous with the term "including". Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa. Aspects of the invention include those that are substantially free of, essentially free of, or completely free of any element, step, composition, ingredient or other claim element not expressly recited or described.

We claim:

1. A method of mitigating pyrolysis coke comprising the steps of:
    (a) measuring an absolute upstream temperature T1 in a pyrolysis reactor, wherein the pyrolysis reactor comprises a parallel tube assembly having an inlet manifold, a plurality of radiant tubes, and an adiabatic restriction in at least one tube of the plurality of radiant tubes, wherein the upstream temperature is measured at a location that is upstream of the adiabatic restriction;
    (b) measuring an absolute temperature T2 downstream of the adiabatic restriction;
    (c) measuring an absolute upstream pressure at a location that is upstream of the adiabatic restriction to provide an upstream pressure P1;
    (d) determining an absolute downstream pressure P2 using the formula $$P2 = P1 \times (T2/T1)^{(k/(k-1))}$$

wherein k is the ratio of fluid specific heat at constant pressure (Cp) to fluid specific heat at constant volume (Cv); and
    (e) performing one or more of the following steps:
        (i) adjusting cracking intensity of the pyrolysis reactor;
        (ii) adjusting feed and fuel control valves to distribute coking rate in the parallel tube assembly;
        (iii) determining decoking time; and
        (iv) adjusting the amounts of decoking air or decoking steam.

2. The method of claim 1, wherein the steps (a)-(e) are performed to affect the amount of distribution of coke accumulation in the parallel tube assembly.

3. The method of claim 1, wherein the inlet manifold is insulated.

4. The method of claim 1, wherein k is in a range of from 1.1 to 1.3 during cracking.

5. The method of claim 1, wherein k is in a range of from 1.2 to 1.4 during decoking.

6. The method of claim 1, wherein the absolute upstream temperature and absolute downstream temperature are measured by an insulated skin thermowell.

7. The method of claim 1, wherein process flow is substantially adiabatic through the adiabatic restriction in the at least one tube of the plurality of radiant tubes.

8. The method of claim 1, wherein the absolute temperature measurement T1 is taken at substantially the same position in the process flow as the absolute pressure measurement P1.

9. The method of claim 1, wherein the measured absolute upstream temperature T1 and absolute downstream temperature T2 correlate to a process flow pressure within each of the radiant tubes.

10. The method of claim 1, wherein the absolute downstream pressure P2 indicates coke accumulation in the parallel tube assembly.

11. The method of claim 1, wherein decoking begins when the difference between the absolute upstream temperature T1 and the absolute downstream temperature T2 is less than about 400° F.

12. The method of claim 1, wherein the absolute downstream pressure P2 correlates directly with accumulated coke.

13. The method of claim 1, wherein k substantially equals 1.3 during decoking.

14. The method of claim 1, wherein k substantially equals 1.13 during cracking.

15. A method of mitigating pyrolysis coke comprising the steps of:
    measuring an absolute upstream temperature T1 in a pyrolysis reactor, wherein the pyrolysis reactor comprises a parallel tube assembly having an inlet manifold, a plurality of radiant tubes, and an adiabatic restriction in at least one tube of the plurality of radiant tubes, wherein the upstream temperature is measured upstream of the adiabatic restriction;
    measuring an absolute temperature T2 downstream of the adiabatic restriction;
    measuring an absolute pressure upstream of the adiabatic restriction to provide an upstream pressure P1;

determining an absolute downstream pressure P2 using the formula $$P2 = P1 \times (T2/T1)^{(k/(k-1))}$$

wherein k is the ratio of fluid specific heat at constant pressure (Cp) to fluid specific heat at constant volume (Cv); and injecting steam into the reactor, or discontinuing the pyrolysis reaction and decoking the radiant tubes, when P2 exceeds a factor F of about 50 to 90 percent of P1.

16. A method of optimizing a pyrolysis reaction comprising the steps of:

measuring an absolute upstream temperature T1 in a pyrolysis reactor, wherein the pyrolysis reactor comprises a parallel tube assembly having an inlet manifold, a plurality of radiant tubes, and an adiabatic restriction in at least one tube of the plurality of radiant tubes, wherein the upstream temperature is measured upstream of the adiabatic restriction;

measuring an absolute temperature T2 downstream of the adiabatic restriction;

measuring an absolute pressure upstream of the adiabatic restriction to provide an upstream pressure P1;

determining an absolute downstream pressure P2 using the formula $$P2 = P1 \times (T2/T1)^{(k/(k-1))}$$

wherein k is the ratio of fluid specific heat at constant pressure (Cp) to fluid specific heat at constant volume (Cv); and decoking the reactor is discontinued and/or resuming the pyrolysis reaction when P2 is less than a factor G of about 10 to 50 percent of P1.

17. A system for mitigating pyrolysis coke comprising:

a pyrolysis reactor having a parallel tube assembly comprising a plurality of radiant tubes;

an insulated adiabatic flow restriction at an inlet of each of the plurality of radiant tubes;

an insulated inlet manifold fluidically connected to each of the plurality of radiant tubes;

an insulated skin thermowell for measuring a specified temperature-inferred pressure, wherein the specified temperature-inferred pressure comprises an upstream temperature of the restriction and a downstream temperature of the restriction, and the upstream temperature and the downstream temperature are directly proportional to a process flow pressure downstream of the restriction; and a process control system for use in conjunction with the specified temperature-inferred pressure measurements, wherein the process control system is in communication with one or more air, steam and/or fuel control valves.

18. The system of claim 17, wherein an increase in downstream process flow pressure is calculated via the adiabatic expansion correlation:

$$P2 = P1 \times (T2/T1)^{(k/(k-1))}$$

wherein k is the ratio of fluid specific heat at constant pressure (Cp) to fluid specific heat at constant volume (Cv), P1 is an upstream pressure, T1 is the upstream temperature and T2 is the downstream temperature.

19. The system of claim 18, wherein k substantially equals 1.13 during cracking.

20. The system of claim 18, wherein k is in a range of 1.1 to 1.3 during cracking.

21. The system of claim 18, wherein k substantially equals 1.3 during decoking.

22. The system of claim 18, wherein k is in a range of about 1.2 to about 1.4 during decoking.

* * * * *